Patented July 22, 1952

2,604,481

UNITED STATES PATENT OFFICE 2,604,481

FATTY ESTER-AMIDE SULFONATES

Ronald A. Henry, China Lake, Calif., assignor to The Procter & Gamble Company, a corporation of Ohio No Drawing. Application September 8, 1949, Serial No. 114,679

6 Claims. (Cl. 260—401)

This invention relates to surface-active fatty ester-amide sulfonates and to processes of preparing them.

It is well known that surface-active properties, such as reduced surface tension and high sudsing, washing and wetting power, are exhibited by high molecular compounds which posses both hydrophilic and lipophilic groups in proper balance, but some of these compounds are undesirably expensive while others, such as ordinary soap, are subject to the disadvantages that they are destroyed by acid or are grained out by strong salt solutions or are precipitated by alkaline earth and heavy metal salts such as are found in sea water and natural hard waters.

It is an object of this invention to provide new and inexpensive surface-active agents. Another object is to provide wetting, sudsing and washing agents which are efficient in hard, soft or salt water and do not form curd therein and which can also be used in dilute acids or alkalis. Another object is to provide detergents which cleanse efficiently without the formation of large volumes of suds. Other objects are to provide properly balanced fatty ester-amide sulfonates and processes whereby they may be prepared. Other objects will appear in the description which follows.

I have discovered a new class of compounds which by suitable treatment can be converted into surface-active agents which have the hydrophilic-lipophilic structure in proper balance and possess the desirable properties just described, but which do not have the disadvantages of soap, and which can be prepared from readily available materials by inexpensive manufacturing processes. These new surface-active agents are the sulfonation products of compounds of the formula:

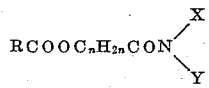

wherein RCO represents acyl groups of substantially saturated fatty acids of about 8 to 22 carbon atoms, $n$ is an integer not more than 5, X is hydrogen or an alkyl radical of not more than 4 carbon atoms, and Y is an aryl, aralkyl or alkaryl radical of not more than 10 carbon atoms. It is to be understood that an alkyl radical means herein a univalent radical derived from a saturated aliphatic hydrocarbon by removing one hydrogen atom therefrom, that an aryl radical means a univalent radical derived from an unsubstituted aromatic hydrocarbon by removing one hydrogen atom therefrom, that an aralkyl radical means an alkyl radical in which one hydrogen atom has been replaced by an aryl radical, and that an alkaryl radical means an aryl radical in which one hydrogen atom has been replaced by an alkyl radical.

The surface-active agents of my invention can be prepared from a primary or secondary hydroxy amide of the general formula

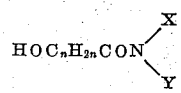

wherein $n$, X and Y have the same meanings as in the above generic formula. This hydroxy amide is first esterified with substantially saturated fatty acids of about 8 to 22 carbon atoms, the resulting ester-amide is then sulfonated, and the resulting sulfonic acid is ordinarily neutralized to form a water-soluble salt, although for some applications such neutralization is not necessary.

As an aid in understanding the invention, one method of preparing my surface-active fatty ester-amide sulfonates will be described fully. A hydroxy alkyl ester is used as a starting material, such as can be prepared for example by esterifying a saturated aliphatic monohydroxy monocarboxylic acid of not more than 6 carbon atoms with a monohydric aliphatic alcohol, the latter being preferably low boiling and containing not more than 4 carbon atoms for convenience in removing from the reaction mixture. Methyl hydroxyacetate is an example of such a hydroxy ester, but it will be understood that it can of course be made by methods other than direct esterification, such for example as synthesis from carbon monoxide, hydrogen and water.

This hydroxy ester is then amidified with an amine of the general formula

where again X and Y have the same meanings as in the foregoing generic formula. The following equation illustrates such a reaction, which is commonly accelerated by heating and continuously removing the alcohol as rapidly as it is formed.

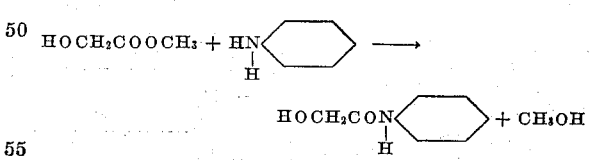

By heating with an acid chloride or mixed acid chlorides of substantially saturated fatty acids of 8 to 22 carbon atoms the resulting hydroxy amide is then converted into an ester-amide, as illustrated by the formula:

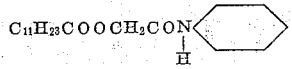

Such a reaction is commonly carried out in the presence of an "acid acceptor" not readily attacked by the acid chloride, capable of neutralizing the hydrochloric acid formed, and not sufficiently strong to cause appreciable splitting of the ester linkage. Pyridine and other tertiary amines such as trimethyl- and triethylamine and the like are illustrative of such acid acceptors, which may be used either alone or in conjunction with inert neutral solvents such as benzene, carbon tetrachloride, ethylene dichloride and the like.

Treatment of the ester-amide with a strong sulfonating agent such as fuming sulfuric acid gives the free sulfonic acid, illustrated by the formula:

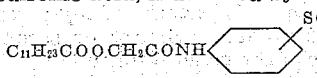

If desired, this sulfonic acid can be neutralized with any alkaline-reacting substance which produces a water-soluble salt thereof, such for example as sodium hydroxide.

While products possessing useful surface-active properties are obtainable when the RCO group of the above general formula is the acyl group of any saturated fatty acid of about 8 to 22 carbon atoms or mixtures thereof or even mixtures thereof with small amounts of high molecular unsaturated fatty acids, especially valuable products result when lauric or myristic acids are used or mixtures of these acids with smaller amounts of other acids, such as the mixtures occurring in combined form in coconut oil or other oils of the coconut oil group. By oils of the coconut oil group I mean to designate all vegetable seed oil or fats at least 50 per cent by weight of the combined fatty acids of which are lauric and/or myristic acids. These oils (many examples of which are given in Hilditch's "The Chemical Constitution of Natural Fats," second edition (1947), pages 198–205) are commonly derived from the seed of members of the botanical families Lauraceae (tangkallak kernel oil for example), Myristicaceae (ucuhuba nut oil for example), Vochysiaceae (jaboty kernel oil for example), Salvadoraceae (khakan kernel oil for example), and more especially the Palmae family. Coconut oil is the outstanding example of an oil derived from seed of the Palmae family, but other non-limiting examples of such oils are oils of murumuru kernel, tucuma kernel, cohune nut, ouricoury nut, babassu kernel and palm kernel. While the small amounts of unsaturated acids present in the mixed fatty acids of oils of the coconut oil group are not seriously objectionable, it is in general preferred that the fatty acids be derived from oils or fats having an iodine value not substantially more than 20. Substantial absence of ethylenic double bonds in the compounds means fewer side reactions during sulfonation, so that the products obtained are as a rule of better color and are better detergents.

The acyls represented by RCO are commonly those of fatty acids derived from animal or vegetable oils, fats or waxes (all of which for convenience I shall designate generically as "fats") of low iodine value or from those which have been fully or partially hydrogenated, catalytically rearranged and/or grained or otherwise treated to reduce their iodine value, but synthetic fatty acids may also be used, such for example as those obtained by oxidizing petroleum hydrocarbons or by hydrogenating carbon monoxide (the so-called Fischer-Tropsch process) or indirectly by oxidizing the saturated or unsaturated hydrocarbons or oxygenated hydrocarbons resulting from that process.

The following table gives examples of various radicals which may be represented by $C_nH_{2n}$ in the above given generic formula, and the corresponding acids from which they are derived:

Table

| $C_nH_{2n}$ | Corresponding Acid Formula | Name |
| --- | --- | --- |
| —CH₂— | CH₂OHCOOH | Hydroxyacetic. |
| —CH₂CH₂— | CH₂OHCH₂COOH | Beta hydroxy propionic. |
| —CH—<br>CH₃ | CH₃CHOHCOOH | Alpha hydroxy propionic. |
| —CH—<br>C₂H₅ | CH₃CH₂CHOHCOOH | Alpha hydroxy butyric. |
| —CHCH₂—<br>CH₃ | CH₃CHOHCH₂COOH | Beta hydroxy butyric. |
| —CH₂CH₂CH₂— | CH₂OHCH₂CH₂COOH | Gamma hydroxy butyric. |
| —C—<br>CH₃ CH₃ | (CH₃)₂COHCOOH | Alpha hydroxy isobutyric. |
| —CH—<br>CH₂CH₂CH₃ | CH₃CH₂CH₂CHOHCOOH | Alpha hydroxy valeric. |
| —CH—<br>CH(CH₃)₂ | (CH₃)₂CHCHOHCOOH | Alpha hydroxy isovaleric. |
| —CCH₂—<br>CH₃ CH₃ | (CH₃)₂COHCH₂COOH | Beta hydroxy isovaleric. |
| —CH—<br>C₄H₉ | CH₃CH₂CH₂CH₂CHOHCOOH | Alpha hydroxy caproic. |
| —CH—<br>CH₂CH(CH₃)₂ | (CH₃)₂CHCH₂CHOHCOOH | Alpha hydroxy isocaproic. |

For amidifying the hydroxy ester in the foregoing preparation procedure, primary or secondary amines are used, one of the valence bonds of the nitrogen of which is satisfied by hydrogen, a second bond by either hydrogen or an alkyl group of not more than 4 carbons, and the third bond by an aryl, aralkyl or alkaryl radical of not more than 10 carbons, such for example as aniline, N-methyl, -ethyl, -propyl, -isopropyl, -butyl or -isobutyl anilines, toluidine, xylidene, mesidine, N-methyl toluidine, naphthylamine, benzylamine, alpha-methyl benzylamine, N-propyl benzylamine and the like. The alkyl portion of the amine or of the alkaryl or aralkyl radicals thereof may be either straight chain or branched.

Sulfonation of the ester-amides which I have described can be accomplished with strong sulfonating agents such as 98–100% sulfuric acid or sulfur trioxide. Fuming sulfuric acid (such for example as that containing about 55% to 60% free sulfur trioxide by weight) is especially suitable for the purpose, since with it excessive splitting of the fatty acid ester linkage does not occur nor are there excessive side reactions, the chief reaction being mono-sulfonation of the benzene ring. In order to obtain good color and a high degree of completeness of sulfonation, temperatures above about 60° C. should preferably be avoided during the reaction, and both agitation and temperature control should be efficient in order to prevent localized overheating at or near the point of contact of the ester-amide and the sulfonating acid, and also to prevent localized excesses of the sulfonating acid.

Various organic solvents, diluents or thinning agents can be used advantageously during the sulfonation, such for example as dioxane, saturated aliphatic hydrocarbons or chlorinated hydrocarbons or low molecular esters, of which hexane, carbon tetrachloride, ethylene dichloride and methyl and ethyl acetates are illustrative. Such solvents, diluents or thinning agents are helpful in reducing the viscosity of the acid reaction mixture thus making thorough and rapid mixing easier and preventing local excesses of sulfonating acid; they make the sulfonation less drastic and reduce side reactions, and they reduce the tendency of the sulfonating acid to split the fatty acid ester linkages.

For some purposes, the acid sulfonation products are used without neutralization. More commonly, when the sulfonation reaction is complete the acid reaction mixture is neutralized, preferably at a low temperature, not substantially above 50° C., and to a pH (measured at 25° C.) of about 5 to 8. To avoid splitting of fatty ester linkages, the alkali should be added slowly to the acid mixture, and mixing and cooling should be efficient in order to insure against localized excess of alkali or localized high temperature at any point in the reaction mixture.

Any basic substance can be used for this neutralization, provided the resulting salt is water soluble. Sodium hydroxide is most commonly used, but alkaline sodium salts, other alkali metal bases, amines, ammonium hydroxide and substituted ammonium hydroxides can also be used.

I have described a new class of surface-active substances and a convenient and inexpensive process whereby they can be made. Some of the steps in this process can be altered if desired. Thus in the step described as amidifying a hydroxy alkyl ester derived from a substantially saturated aliphatic monohydroxy monocarboxylic acid of not more than 6 carbon atoms and a monohydric aliphatic alcohol of not more than 4 carbon atoms, the alcohol can if desired contain more than 4 carbons, although in this case there is more difficulty in removing the alcohol which is liberated from the reaction mixture as a reaction product. Furthermore, instead of using alkyl esters of the hydroxy acids (such for example as methyl, ethyl or even lauryl or cetyl esters), I can use other types of esters, such for example as a hydroxy ester acid, as illustrated by the reaction:

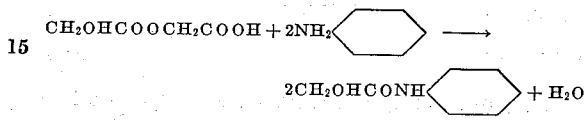

or an alkyl ester of a hydroxy ester acid, as illustrated by the reaction:

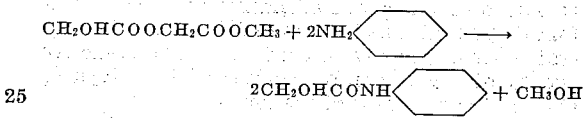

Furthermore, I can use inner esters such as lactides or lactones, as illustrated by the reactions:

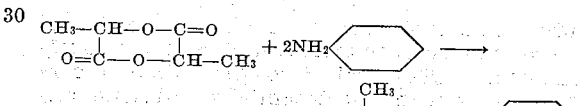

or

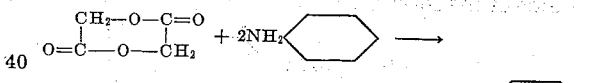

or

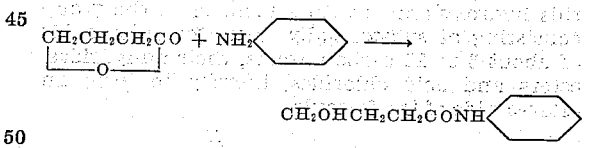

It will thus be perceived that any type of ester can be used provided the acid constituent thereof is that of a substantially saturated aliphatic monohydroxy monocarboxylic acid of not more than 6 carbon atoms; when this number of carbon atoms is appreciably exceeded, solubility and surface-active properties of the final sulfonated product begin to suffer.

Instead of using esters of the above-mentioned type of acids, the acids themselves can be subjected successfully to the amidification reaction, as illustrated by the equation:

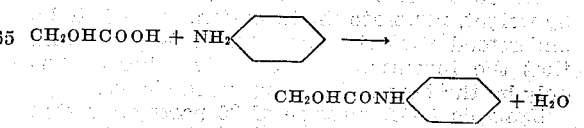

Furthermore, anhydrides of such acid can be used. Lactones and lactides have already been discussed. Especially suitable are the anhydrides formed by eliminating water from the carboxyl groups of two molecules of either the same or different saturated aliphatic monohydroxy monocarboxylic acids of not more than 6 carbon atoms, as illustrated by the reactions:

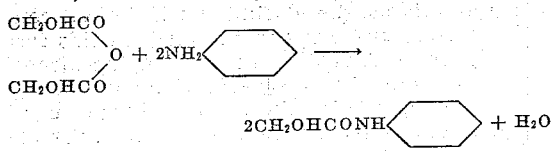

and

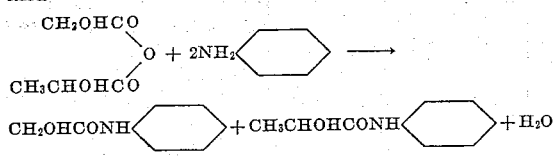

Also, in making the ester-amide from the hydroxyamide, free fatty acid or its anhydride or an ester thereof can be used instead of a fatty acid chloride to acylate the hydroxy amide. Wide variation in choice of sulfonating agents and sulfonating conditions is also possible. Thus in general terms, preparation of the surface-active agents of my invention comprises the steps of (1) heating an amine of the formula

where X is hydrogen or an alkyl radical of not more than 4 carbon atoms and Y is an aryl, aralkyl or alkaryl radical of not more than 10 carbon atoms with a substantially saturated aliphatic monohydroxy monocarboxylic acid of not more than 6 carbon atoms or an ester thereof or an anhydride thereof, thereby to form a hydroxy amide of the formula

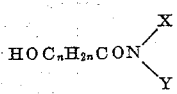

where $n$ is an integer not greater than 5 and X and Y are as above defined, and (2) acylating this hydroxy amide with a member of the group consisting of substantially saturated fatty acids of about 8 to 22 carbon atoms, their anhydrides, esters and acid chlorides, thereby to form an ester-amide of the formula

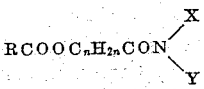

wherein RCO is the acyl group of the above mentioned fatty acids and $n$, X and Y are as above defined, and (3) reacting this ester-amide with a sulfonating agent thereby to introduce a sulfonic acid group into the ring structure of Y. For most purposes there follows the further step of neutralizing this sulfonic acid and any excess sulfonating agent to form water-soluble salts thereof.

The following examples, in which all parts are by weight, illustrate the invention, but it is to be understood that they are illustrative only and that the invention is not limited thereby but only by the terms of the appended claims.

*Example 1.*—A mixture of 90 parts of methyl hydroxyacetate (which can for example be prepared by esterifying methyl alcohol with hydroxy acetic acid) and 93 parts of aniline was heated for 4 hours at 135–150° C. under an air condenser. The mixture was then cooled to 0° C. to form a soft mass of crystals. These were slurried with 100 parts of a 1:1 mixture of benzene and gasoline and were then filtered. The recovered crystals were washed first with cold ethyl alcohol and then with benzene, essentially pure N-phenyl hydroxyacetamide being thus obtained.

Sixty parts of the above crystals were dissolved in 70 parts of pyridine and 50 parts of benzene. One hundred nine parts of lauroyl chloride, dissolved in 50 parts of benzene, were added slowly at 5–10° C., with continuous agitation. The mixture was heated to boiling for 2 hours under a reflux condenser, and was then washed with 5% hydrochloric acid to remove pyridine, with 1% sodium carbonate to remove fatty and mineral acids, and finally with water. It was dried over anhydrous sodium sulfate and the solvents were driven off by heat. The saponification value of the product thus obtained was 172, as compared with theoretical saponification value of 169 for N-phenyl hydroxyacetamide laurate. The yield was 97.4% of theory.

66.6 parts of N-phenyl hydroxyacetamide laurate prepared in this manner were dissolved in 151 parts of ethylene dichloride, and 55 parts of fuming sulfuric acid containing about 60% free $SO_3$ were slowly added thereto, while keeping the temperature between 35 and 40° C. Twenty minutes were allowed for the sulfonation reaction. The resulting paste was neutralized with sodium hydroxide solution, the mixture being kept cold and excess of NaOH being avoided. The neutralized mixture was extracted with petroleum ether, 15 parts of sodium sulfate and 3 parts of disodium hydrogen orthophosphate were added to the petroleum ether insoluble matter, the mixture was adjusted to pH 7 and was then roll dried.

The product obtained was largely

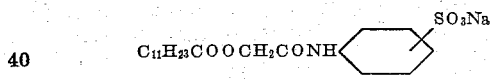

It is markedly surface active, possesses wetting, and washing power, and retains its effectiveness in and is not precipitated by hard water, salt water or dilute acid.

Essentially similar results can be obtained when instead of using methyl hydroxy acetate one substitutes

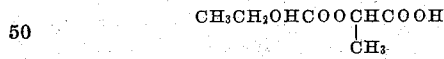

or

CH₂OHCOOCH₂COOH or

CH₂OHCOOCH₂COOCH₃ therefor, and then proceeds to amidify, acylate, sulfonate and neutralize essentially as in Example 1. Furthermore, essentially similar results can be obtained when glycollide or the lactide of lactic acid or beta propiolactone or gamma valerolactone or glycollic anhydride or free hydroxy acetic acid are substituted for methyl hydroxy acetate in Example 1.

*Example 2.*—A mixture of 161.5 parts of N-methyl aniline and 139.5 parts of methyl hydroxyacetate was refluxed for 16 hours under an air condenser at 135–145° C. Methyl alcohol and other volatile matter were then removed by heating to 100° C. under a vacuum of 1–2 mm. of mercury.

82 parts of the N-phenyl-N-methyl-hydroxyacetamide prepared in this manner were dissolved in 60 parts of pyridine and 100 parts of benzene. 120 parts of lauroyl chloride were added with stirring, keeping the temperature below 20° C. After stirring for 1 hour at room temperature and for 1 hour at 80° C., the reaction mixture stood overnight at room temperature. It was then washed, first with dilute acid, then with dilute Na₂CO₃, and finally with water until neutral.

Sixty-nine parts of N-phenyl-N-methyl hydroxyacetamide laurate prepared in this manner were dissolved in 55 parts of ethylene dichloride and were sulfonated by adding slowing thereto 47 parts of 60% oleum, keeping the temperature between 20° and 25° C. Twenty-five minutes were allowed for sulfonation, following which the resulting paste was chilled, neutralized with sodium hydroxide, and extracted with petroleum ether. Fifteen parts of sodium sulfate and three parts of disodium hydrogen orthophosphate were added, and the mixture was adjusted to pH 7 and then roll dried.

The product consisted largely of

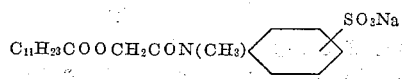

It is a powerful surface-active detergent and retains its effectiveness in and is not precipitated by hard, salt or acidic waters. It develops a high degree of washing power at concentrations at which it produces only small amounts of suds and is thus particularly well adapted for cleansing purposes where excessive sudsing is undesirable, as for example in automatic dish washing machines and certain types of laundry machines.

*Example 3.*—N-phenyl-N-ethyl hydroxyacetamide was prepared by reacting 181.5 parts of N-ethyl aniline and 139.5 parts of methyl hydroxyacetate in the manner described in Example 2. Eighty-nine parts of this compound, dissolved in 60 parts of pyridine and 100 parts of benzene, were then acylated by treatment with 120 parts of lauroyl chloride as described in Example 2. Seventy-three parts of the resulting N-phenyl-N-ethyl hydroxyacetamide laurate were dissolved in 53 parts of ethylene dichloride and were sulfonated by adding thereto 50 parts of technical 60% oleum under the conditions described in Example 2. The resulting paste was neutralized and extracted. Fifteen parts of sodium sulfate and 3 parts of disodium hydrogen orthophosphate were added and the mixture was then adjusted to pH 7 and roll dried. The product was largely

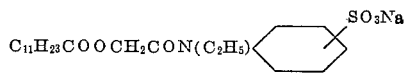

It is a powerful surface-active detergent and retains its effectiveness in and is not precipitated by hard, salt or acidic water. It develops a high degree of washing power at concentrations at which it produces only small amounts of suds and is thus particularly well adapted for cleansing purposes where excessive sudsing is undesirable, as for example in automatic dish washing machines and certain types of laundry machines.

It is to be understood that the products of the invention can be treated in conventional manner to remove unsulfonated organic matter, inorganic salts, etc., or they may if desired be used without purifying. Conventional drying methods, such as drum drying, vacuum drum drying, spray-drying and the like can also be applied, if desired. The physical character of the product, whether it be in bar, flake, granule, powder, paste, liquid or other form, is not a limitation upon the invention. Furthermore, the product can if desired be used in conjunction with soap or with other anionic organic detergents (such for example as alkyl sulfates and sulfonates) or with non-ionic organic detergents (such for example as alkyl ethers of polyethylene glycol or alkyl phenol ethers thereof or corresponding thio ethers) or with inorganic salts (such for example as sodium sulfate, sodium chloride, sodium bicarbonate, mildly alkaline sodium silicate, sodium pyro-, tri-, tetra- or meta-phosphate and the like) or with relatively unreactive organic compounds (such for example as fluorescing agents, carboxymethylcellulose, starch, urea, high molecular aliphatic alcohols, fatty acid monoglycerides, fatty acid amides and the like). In general, however, combinations of water, strong alkali and heating are to be avoided lest some splitting of the fatty ester linkage take place. It is especially advisable that when the sulfonated products are being heated during drying, the pH be near 7 and the heating be as brief and to as low a temperature as possible.

Having thus described my invention, what I claim and desire to secure by Letters Patent is:

1. Surface-active material which is the sulfonation product of compounds of the formula

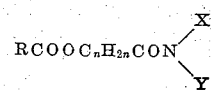

wherein RCO represents acyl groups of substantially saturated fatty acids of about 8 to 22 carbon atoms, $n$ is an integer not more than 5, X is a member of the group consisting of hydrogen and alkyl radicals of not more than 4 carbon atoms, and Y is a member of the group consisting of aryl, aralkyl and alkaryl radicals of not more than 10 carbon atoms, said sulfonation occurring in the aryl portion of the molecule.

2. Water-soluble surface-active salts of the sulfonation products of compounds of the formula

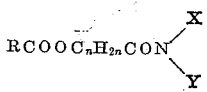

where RCO represents acyl groups of fatty acids of about 8 to 22 carbon atoms derived from fats of iodine value not substantially more than 20, $n$ is an integer not more than 5, X is a member of the group consisting of hydrogen and alkyl radicals of not more than 4 carbon atoms, and Y is a member of the group consisting of aryl, aralkyl and alkaryl radicals of not more than 10 carbon atoms, said sulfonation occurring in the aryl portion of the molecule.

3. Water-soluble surface-active salts of the sulfonation products of compounds of the formula

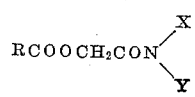

where RCO represents acyl groups of fatty acids of an oil of the coconut oil group, X is a member of the group consisting of hydrogen and alkyl radicals of not more than 4 carbon atoms, and Y is a member of the group consisting of aryl, aralkyl and alkaryl radicals of not more than 10 carbon atoms, said sulfonation occurring in the aryl portion of the molecule.

4. As new surface-active agents, compounds of the formula

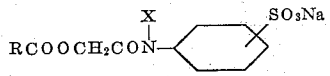

wherein RCO represents acyl groups of substantially saturated fatty acids of about 8 to 22 carbon atoms and X is a member of the group consisting of hydrogen and alkyl radicals of not more than 4 carbon atoms.

5. A process of preparing surface-active agents which comprises the steps of (1) amidifying a member of the group consisting of substantially saturated aliphatic monohydroxy monocarboxylic acids of not more than 6 carbon atoms, anhydrides thereof and esters thereof by treating said member with an amine of the formula

where X is a member of the group consisting of hydrogen and alkyl groups of not more than 4 carbon atoms and Y is a member of the group consisting of aryl, aralkyl and alkaryl radicals of not more than 10 carbon atoms, thereby to form a hydroxy amide, (2) acylating the hydroxy amide obtained in step (1) to introduce therein an acyl group of a substantially saturated fatty acid of about 8 to 22 carbon atoms, and (3) sulfonating the ester-amide obtained in step (2), said sulfonation occurring in the aryl portion of the molecule.

6. A process of preparing surface-active agents which comprises the steps of (1) heating the hydroxy ester of a substantially saturated aliphatic monohydroxy monocarboxylic acid of not more than 6 carbon atoms and an aliphatic monohydroxy alcohol of not more than 4 carbon atoms with an amine of the formula

X being a member of the group consisting of hydrogen and alkyl groups of not more than 4 carbon atoms and Y being a member of the group consisting of aryl, aralkyl and alkaryl radicals of not more than 10 carbon atoms, thereby to form a hydroxy amide of the formula

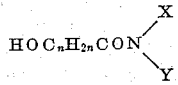

$n$ being an integer not greater than 5 and X and Y being as hereinabove defined, (2) heating the hydroxy amide formed in step (1) with a member of the group consisting of substantially saturated fatty acids of about 8 to 22 carbon atoms, their anhydrides, esters and acid chlorides to form an ester-amide of the formula

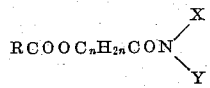

$n$, X and Y being as hereinabove defined, and (3) mixing the ester-amide obtained in step (2) with fuming sulfuric acid in the presence of an organic thinning agent with agitation at a temperature not substantially exceeding 60° C. to introduce a sulfonic acid group into the ring structure of said esteramide, and (4) while restraining the temperature from rising substantially above 50° C., adding sodium hydroxide to the sulfonic acid obtained in step (3) in such manner and amount that localized overheating and localized excesses of alkali do not occur and that the pH of the final mixture measured at 25° C. is between 5 and 8.

RONALD A. HENRY.

REFERENCES CITED

The following references are of record in the file of this patent:

UNITED STATES PATENTS

| Number | Name | Date |
|---|---|---|
| 2,178,139 | Epstein | Oct. 31, 1939 |
| 2,184,770 | Katzman | Dec. 26, 1939 |
| 2,251,940 | Katzman | Aug. 12, 1941 |